(12) United States Patent
Gebert et al.

(10) Patent No.: US 6,425,187 B1
(45) Date of Patent: Jul. 30, 2002

(54) GYRO-SENSOR

(75) Inventors: Klaus Gebert, Nersingen; Werner Riegler, Ulm, both of (DE)

(73) Assignee: Nokia Mobile Phones Ltd., Espoo (FI)

( * ) Notice: Subject to any disclaimer, the term of this patent is extended or adjusted under 35 U.S.C. 154(b) by 124 days.

(21) Appl. No.: 09/659,515

(22) Filed: Sep. 11, 2000

(30) Foreign Application Priority Data

Sep. 10, 1999 (DE) .......................................... 199 43 341

(51) Int. Cl.⁷ .............................................. G01C 19/36
(52) U.S. Cl. .......................................... 33/316; 33/347
(58) Field of Search ........................ 33/316, 318, 319, 33/335, 344, 345, 347, 355 R, 356, 357, 358, 359

(56) References Cited

U.S. PATENT DOCUMENTS

| | | | | |
|---|---|---|---|---|
| 2,924,885 A | * | 2/1960 | Lear ............................. | 33/319 |
| 4,359,823 A | * | 11/1982 | White ....................... | 33/355 R |
| 5,339,529 A | | 8/1994 | Lindberg ..................... | 33/359 |
| 5,771,596 A | * | 6/1998 | Bey ............................. | 33/316 |
| 5,878,370 A | | 3/1999 | Olson ........................... | 33/319 |
| 6,301,794 B1 | * | 10/2001 | Parks et al. .................... | 33/356 |

FOREIGN PATENT DOCUMENTS

| | | |
|---|---|---|
| DE | 19731360 | 1/1997 |
| DE | 19833157 | 1/2000 |
| DE | 19845570 | 4/2000 |
| WO | 9902943 | 1/1999 |

* cited by examiner

Primary Examiner—G. Bradley Bennett
(74) Attorney, Agent, or Firm—Antonelli, Terry, Stout & Kraus, LLP

(57) ABSTRACT

A locating device for vehicles with a carrier to be mounted in the vehicle in which a gyro-sensor is located to detect the movement of moving components for the purpose of determining the location. As gyro-sensors must be oriented a certain way in order to fulfill their function, and as this orientation is not possible in all installation locations, the invention is the result of the task of specifying a gyro-sensor that can be used regardless of the corresponding mounting situation, where the corresponding sensor (gyro-sensor) can be oriented at the installation location and manufactured using automated manufacturing processes and where special securing devices are not required to secure the unit in the aligned position. This task is accomplished in that there are complementary tabs and notches located on the gyro-sensor and on the housing in which the gyro-sensor is inserted that permit the gyro-sensor to be mounted in the housing in at least two different positions, and/or that the housing with its casing shell surface is installed in a holding device, where the housing can be installed in the holding device in at least one prescribed position.

9 Claims, 4 Drawing Sheets

GYRO-SENSOR

FIELD OF THE INVENTION

The invention pertains to a locating device for vehicles with a carrier to be mounted in the vehicle in which a gyro-sensor (10) is located to detect the movement of moving components for the purpose of determining the location.

BACKGROUND OF THE INVENTION

Locating devices for vehicles that are used in particular to aid navigation on streets using optical and/or acoustical signals must be able to provide reliable determination of the location. There are satellite navigation methods and navigation devices available to roughly determine the location, but they do not provide the required precision. There is a known method for determining the location more precisely based on this idea in which the movement of the vehicle is recorded and the values obtained are used to calculate the exact location.

To accomplish this, the locating device, which can also be a part of the navigation device, is generally manufactured as a self-sufficient device and installed in the corresponding vehicle. However, the problem arises that the corresponding devices must be installed differently in different vehicles. This is particularly critical because the corresponding sensors (gyro-sensors) must be oriented a specific way to be able to determine the location exactly, and therefore a single locating device that can be used in all vehicles cannot be manufactured. For this reason, locating devices are suggested in the state of the art in which the corresponding sensor (gyro-sensor) is installed in the locating device such that it can be aligned during production or subsequently according to the installation situation. It is suggested in WO 99/02943, for example, to connect the gyro-sensor to an adjustable knob or set screw, where the top of the adjustable knob or set screw is outside of the locating device and the gyro-sensor itself is inside the locating device. Due to the fact that the top of the adjustable knob or set screw can then be accessed from outside the locating device, the gyro-sensor can be adjusted accordingly for the corresponding installation situation after the locating device has been manufactured. A similar procedure is described in U.S. Pat. No. 5,339,529. In this patent the gyro-sensor is placed on a bearing block using an axle that runs through its center point. One end of this axle is connected to an adjusting knob. There is also an axle on the disk that contains grooves in the direction parallel to the axle. There is a locking mechanism that uses the grooves to prevent the gyro-sensor from being rotated and from rotating by itself. The axle is rotated using the adjusting knob to adjust the position of the gyro-sensor to match the corresponding installation situation of the locating device. Once the final position for the corresponding orientation is reached, the gyro-sensor is also secured in this position at the same time by the locking mechanism that interacts with the grooves. As can easily be seen, the known devices used to adjust the orientation according to the various conditions require complex adjusting that is also very difficult to automate due to the precision required. In addition, other securing devices are required, as shown in U.S. Pat. No. 5,339,529, in particular, to permanently stabilize the gyro-sensor setting.

That is why the invention is the result of the task of specifying a locating device that can be used regardless of the corresponding installation situation, where the corresponding sensor (gyro-sensor), through the use of automated manufacturing processes, can be adjusted to the appropriate orientation at the installation site and where special fasteners are not required to secure the sensor in its final, correctly oriented position.

SUMMARY OF THE INVENTION

This task will be accomplished as described below.

If the sensor (gyro-sensor) is placed in a housing that has at least one casing shell surface or is connected to such, where there are complementary tabs and notches on the housing and on the gyro-sensor that allow the gyro-sensor to be installed in at least two different positions in the housing, and/or where the housing with its casing shell surface is placed in a holding device, where the housing can be placed in the holding device in at least one predefined mounting position, then it is ensured that immediately after the gyro-sensor and housing or the housing and holding device are physically connected, the gyro-sensor will be oriented as required for the specific installation. In particular, all measures previously required to orient the sensor (gyro-sensor) after putting the corresponding parts together do not have to be taken anymore.

The last advantage does not exist, however, when the casing shell surface has a cylindrical cross-section as the housing could be rotated in the holding device in this case. However, as stated below that you must be able to place the housing in at least one predefined mounting position in the holder, the advantage stated above exists when complementary tabs and notches in the housing and the holding device are used to determine the predefined mounting position.

The predefined mounting position for the housing in the holder is implemented in that the cross-section of the casing shell surface has at least three edges formed by sections of the casing shell surface. This design has the advantage that the casing shell surface itself is the corresponding feature that is used to orient the housing in the holding device in this design.

If there is at least one tab located on the housing such that a line drawn through this tab and the center point M of the housing intersects one of the sections of the casing shell surface whereby the distances from the point of intersection to the edges of this section of the casing shell surface are different, then a number of orientations can be produced solely through physical contact when assembling the corresponding parts by rotating the housing and holding device or housing and gyro-sensor in opposite directions.

If a circuit board that provides additional electrical contact to other electronic elements of the locating system is necessary for the operation of the sensor (gyro-sensor), then this can also be used as a holding device in the housing.

If there are contact paths on the sensor (gyro-sensor) and/or the circuit board that are concentric with respect to the center point M of the housing when the gyro-sensor is inserted in the housing, then the result is a particularly simple type of contact that is also independent of the corresponding orientation of the sensor in the housing.

We would like to point out at this point that the application of the invention is not limited to gyro-sensors, but can be used for all sensors that require a particular type of orientation.

DETAILED DESCRIPTION OF THE PREFERRED EMBODIMENTS OF THE INVENTION

The invention will now be explained in more detail based on the figures.

Figure 1:
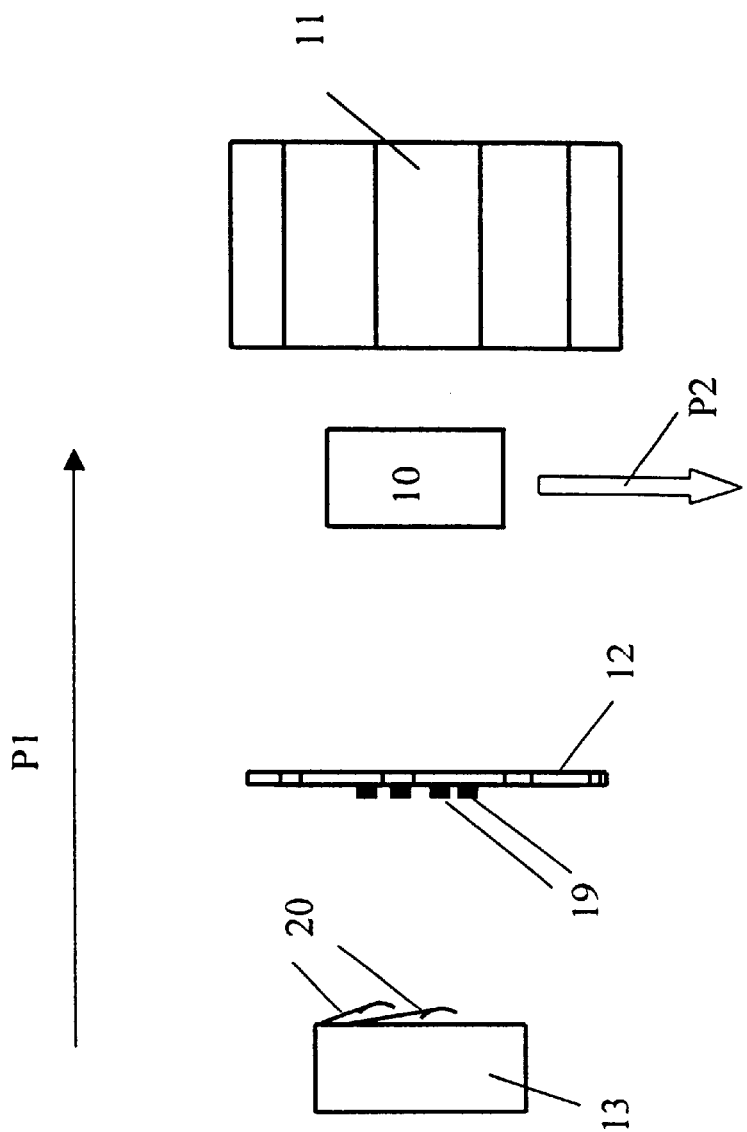
FIG. 1 A side view of the individual parts of a unit according to the invention

FIG. 1 shows the side view of a sensor in the form of a gyro-sensor (10), a housing (11), a circuit board (12) and a interface unit (13). To create a functioning unit, the parts, displayed separately for the purpose of showing the relationship between the parts, are assembled in the direction of the arrow P1.

Figure 2:
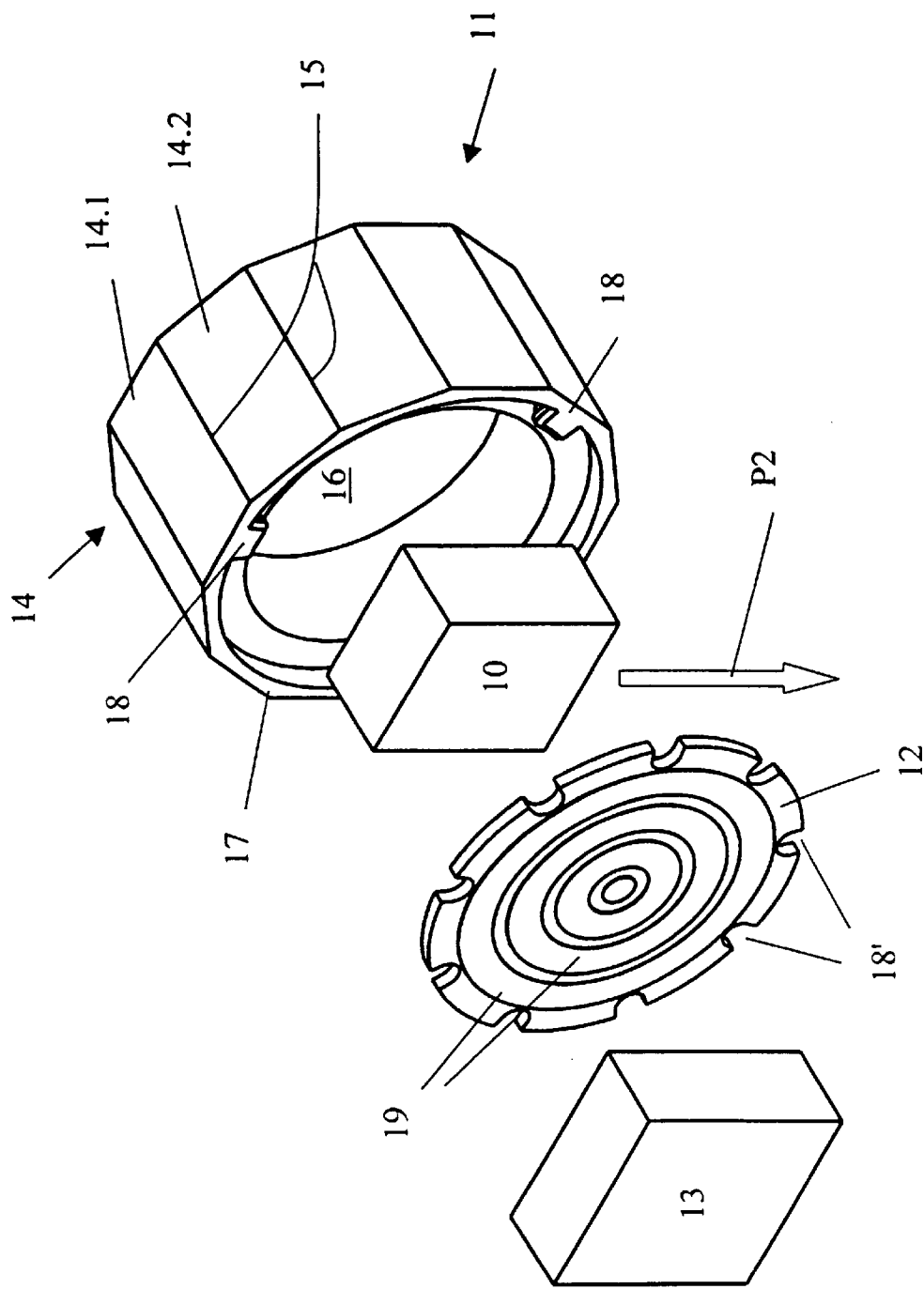
FIG. 2 An exploded view of a unit according to the invention

More detailed information on the unit assembled from the individual parts is shown in FIG. 2, where the relationship between the parts shown in FIG. 1 is shown again in a perspective view. It can clearly be seen in the representation according to FIG. 2 that the-housing (11) is a rotational body whose outer casing shell surface (14) consists of a number of sections of the casing shell surface (14.1–14.n), where each of these sections of the casing shell surface (14.1–14.n) is located between two edges (15). In addition, there is an opening (16) in the housing (11) in which the gyro-sensor (10) is placed in the unit when assembled. There are additional tabs (18) on the front side (17) of the housing (11) that will be explained in more detail in the context of FIG. 3 and 4.

To create a functioning unit from the individual parts (11) through (13) in the present example, it is necessary to first connect the gyro-sensor (10) mechanically and electrically to the circuit board (12) before the gyro-sensor (10) is inserted into the opening (16) of the housing (11). Once the required connections between the gyro-sensor (10) and circuit board (12) have been made, the unit assembled in this manner is connected to the housing (11). To position the gyro-sensor (10) inside the housing (11) there are notches (18') on the outer circumference of the circuit board (12) that match the tabs (18) on the front (17) of the housing (11).

There are two circular contact paths (19) on the side the circuit board (12) facing away from the gyro-sensor (10). If the unit consisting of the circuit board (12) and gyro-sensor (10) is inserted into the housing (11), the gyro-sensor (11) can be easily connected electrically to the interface unit (13) via the contact paths (19) when the interface unit (13), as shown in FIG. 1, contains the corresponding sliding contacts (20). The circular design of the contact paths (19) ensures that there is always an electrical connection between the interface unit (13) and the gyro-sensor (10) regardless of the actual orientation of the unit consisting of the circuit board (12) and gyro-sensor (10) in the housing (11) and/or consisting of the housing (11) in a holding device (more detailed information on this subject will be given in the context of FIG. 3 and 4). In particular, this design avoids the use of expensive cable connections. These cable connections are expensive in this case because they are difficult to realize on an automated production line due to the fact that there is no fixed position for the gyro-sensor (10) in the housing (11).

Just for the sake of completeness we would like to point out that the use of the circuit board (12) is not essential to the invention when the electrical components (not shown) located on this circuit board (12) are located in the gyro-sensor (10) itself. If this is the case, then it is necessary for the Gyro-Sensor (10) to contain the corresponding notches (18.2') in order to position the gyro-sensor (11) in the housing (10). If the especially advantageous contacts to the gyro-sensor (10) are to be kept in this design, then it is also necessary for the circular contact paths (19) to be located directly on the gyro-sensor (10).

Figure 3:
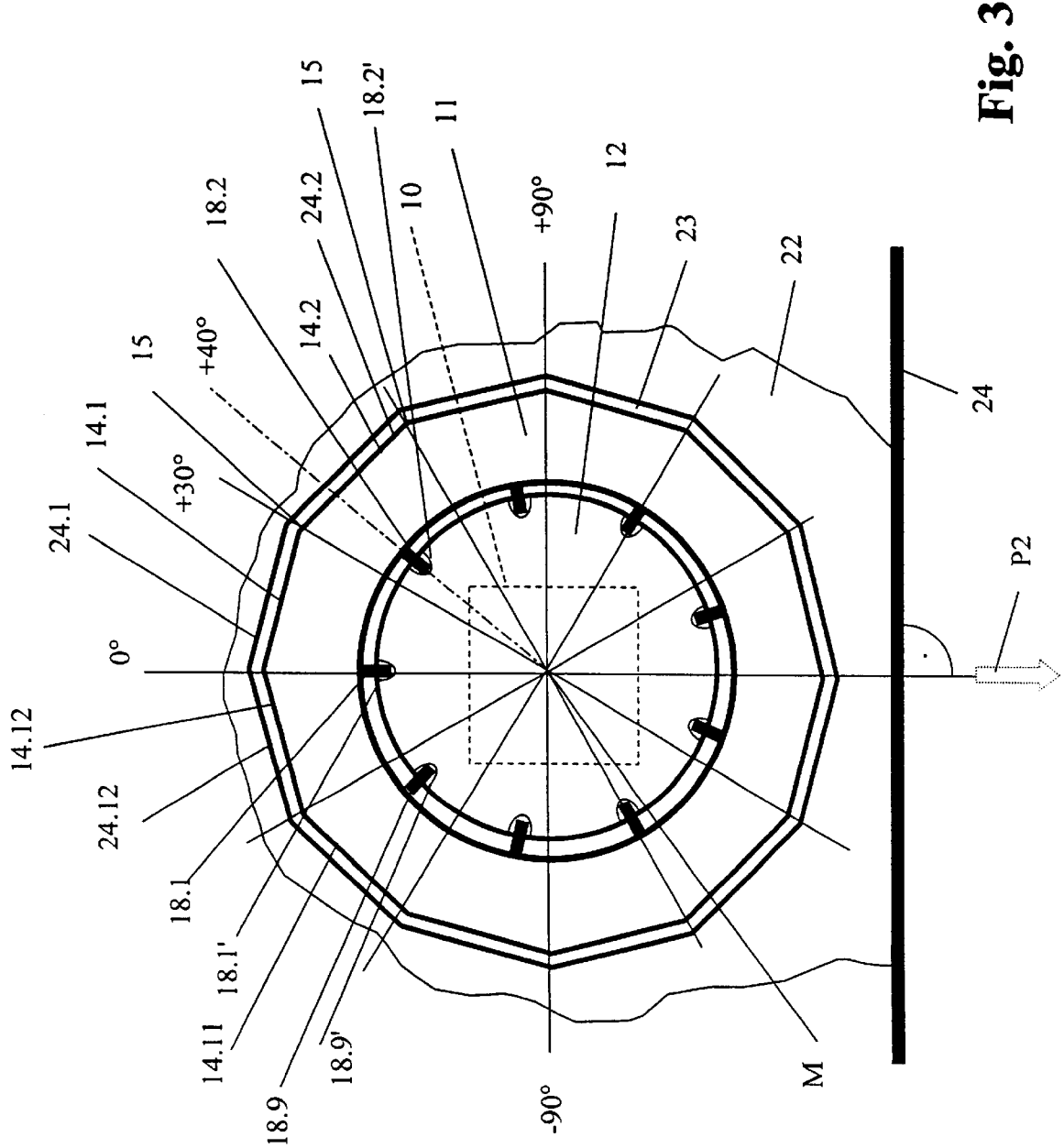
FIG. 3 A frontal view of unit according to the inventions
Figure 4:
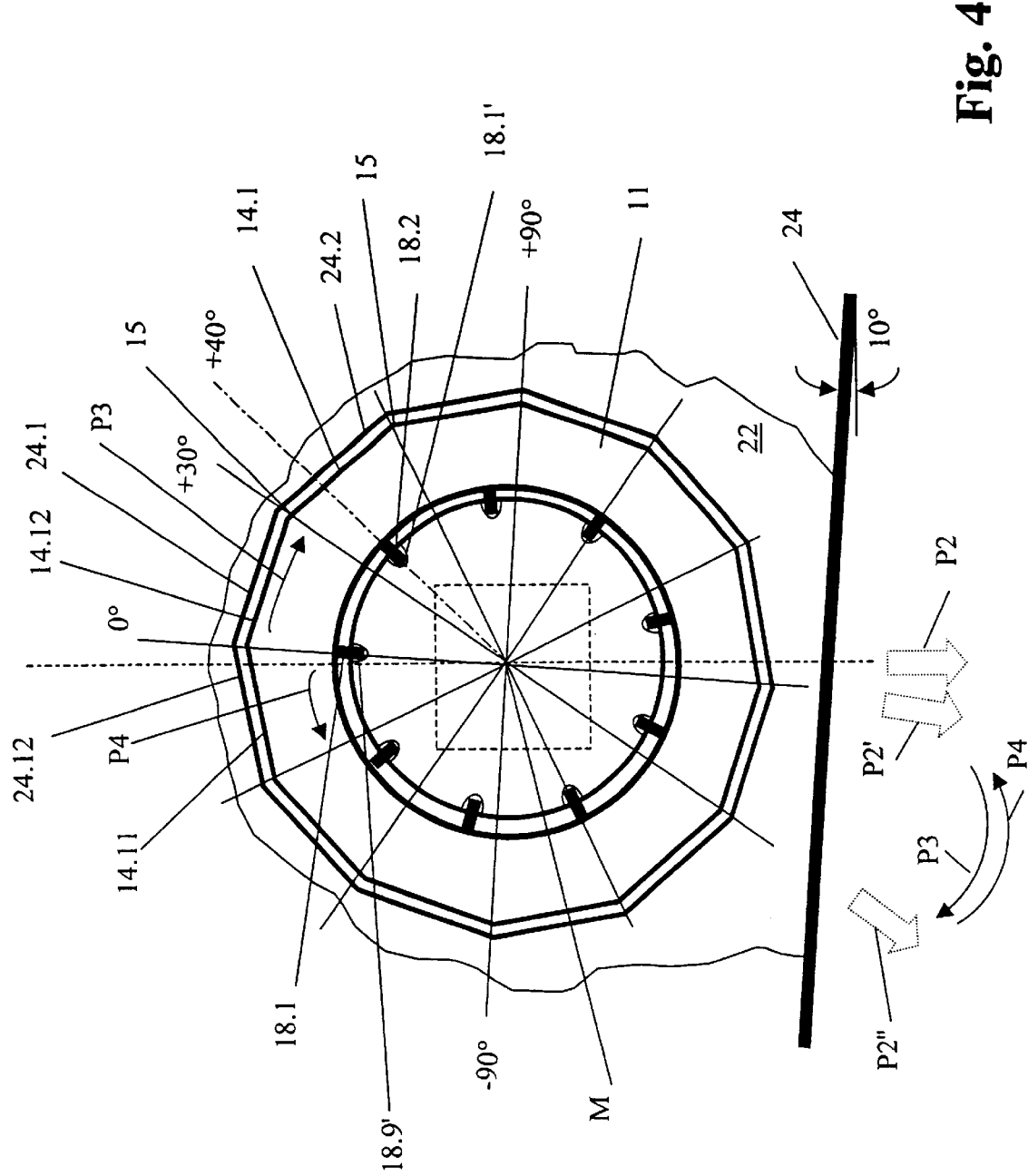
FIG. 4 Another view according to FIG. 3

FIG. 3 shows an example of a gyro-sensor (10) installed in a housing (11). The housing (11) is inserted in a holding device (22) that rests on a base plate (24). The cross-section of the opening (23) in the holding device (22) in which the housing (11) is inserted matches the cross-section of the housing (11). The small gap between the housing (11) and the opening (23) in the cross-sections in FIG. 3 and 4 is only there to improve the representation of the relationship between the parts in the diagram and does not exist in the actual implementation. If, as shown in FIG. 3, the gyro-sensor (10) is inserted in the housing (11) and the housing (11) is inserted in the holding device (22), then the preferred axis P2 of the gyro-sensor (10) points towards the center of the earth, thereby intersecting the base plate (24) at an angle of 90°.

As the base plate (24) is of major importance when mounting the unit in a vehicle, for example, and as this base plate cannot always be mounted at a right angle to the preferred axis P2 of the gyro-sensor (10) at actual installation location, then the preferred axis P2' would be oriented as shown in the diagram in FIG. 4 if the unit shown in FIG. 3 or the base plate (24) shown in the example in FIG. 4 could only be installed at an angle of 10°.

The following steps are necessary to position the preferred axis P2' to point towards the center of the earth for the example shown in FIG. 4: Based on the diagram according to FIG. 3, in order to compensate for the incline of the base plate (24) in FIG. 4 it is first necessary to insert the housing (11) in the holding device (22) so that section (14.1) of the casing shell surface of the housing (11) does not face section (24.1) of the casing shell surface of the holding device (22) as shown in FIG. 3, but so that section (14.12) of the casing shell surface of the housing (11) faces section (24.1) of the casing shell surface of the holding device (22) instead.

Aligning the sections of the casing shell surface (14),(24) in this manner as shown in FIG. 4 and illustrated additionally by the arrow P3 results in the preferred axis P2" corresponding to the diagram shown in FIG. 4. The final orientation of the preferred axis P2 so that it points towards the center of the earth is achieved by aligning notch (18.9') on the circuit board (12) with tab (18.1) of the housing (indicated by arrow P4 in FIG. 4), and not by aligning notch (18.1') on the circuit board with tab (18.1) of the housing (11) as shown in FIG. 3. This ensures that the overcompensation introduced by modifying the relative positions of the sections of the casing shell surfaces (14), (24) in the direction indicated by arrow P3 will be reversed so that the preferred axis P2 will point towards the center of the earth in spite of the incline of the base plate (24).

If in accordance with FIG. 3 and 4 the cross-sections of the housing (11) and the opening (23) in the holding device (22) are designed as a regular dodecagon and the tabs and notches (18), (18') are placed at intervals of 30°, where only one of the tabs (18) on the housing (11) lies on an imaginary line running through the center point M of the housing (11) and one edge (15) located between two adjacent sections of the casing shell surface (14), then it is ensured that, for the normal position (FIG. 3), the other tabs (18) on the housing (11) will each lie between two edges (15) of a section of the casing shell surface (14), and that the orientation of the preferred direction P2 of the gyro-sensor (10) to point towards the center of the earth can be precisely adjusted to within 10° regardless of the inclination of the base plate (24) by "rotating" the circuit board (12) in the housing (11) and/or the housing (11) in the holding device (22). In this context we would like to point out that an orientation of the preferred direction P2, to point towards the center of the earth within 10° of precision is generally completely sufficient for the purpose specified. If this is not the case, then a different angular separation can be selected by designing the cross-section of the housing (11) and holding device (22) as a regular octagon and giving the tabs and notches (18), (18') a separation of 15°, for example.

According to the invention it is obvious that no manual adjustment is required to realize an orientation of the preferred direction P2 of the gyro-sensor (10) through the center of the earth for different installation situations, but that the orientation required for the corresponding installation location can be easily achieved solely through the assembly of the various individual parts. Due to the fact that the required orientation can be achieved by assembling the same parts used for all installation situations, the assembly and orientation of the parts is particularly simple to automate.

Just for the sake of completeness we would like to point out that for a prescribed set of possible installation situations, it may not be necessary to carry out both movements indicated in FIG. 4 by arrows P3 and P4 to orient the preferred axis P2 of the gyro-sensor (10) so that it runs through the center of the earth. If the set of possible installation situations is small, it may be sufficient to implement only one possible method of adjustment (either in the direction of arrow P3 or of arrow P4).

In addition, we would like to point out that when there are only a few different installation situations that require compensation, the cross-sections of the housing (11) and of the opening (23) and/or the degree of separation of the tabs and notches (18), (18') do not necessarily have to be regular. In particular, an irregular, non-symmetrical design of the corresponding parts (11), (12), (22) could ensure that the corresponding individual parts (11), (12), (22) can only be assembled correctly for the few, actually existing installation situations.

What is claimed is:

1. A gyro-sensor apparatus, comprising:

a gyro-sensor having a preferred axis that points towards the center of the earth; and a housing enclosing said gyro-sensor, wherein said housing includes at least one casing shell surface, wherein said housing and said gyro-sensor contain complementary tabs and notches that allow for at least two different mounting positions of said gyro-sensor in said housing, wherein said housing with said casing shell surface is inserted in a holding device, and wherein said housing can be inserted in said holding device in at least one predefined mounting position.

2. A gyro-sensor apparatus according to claim 1, wherein said casing shell surface has a primarily cylindrical cross-section.

3. A gyro-sensor apparatus according to claim 1, wherein said casing shell surface has a cross-section with at least three edges connected to each other by sections of said casing shell surface.

4. A gyro-sensor apparatus according to claim 1, wherein at least one of said tabs on said housing is positioned so that an imaginary line through said one tab and a center point of said housing intersects one section of a plurality of sections of said casing shell surface so that distances from said center point to two edges of said one section of said casing shell surface are different.

5. A gyro-sensor apparatus according to claim 1, further comprising:

a circuit board on which said gyro-sensor is placed, wherein said gyro-sensor is held in said housing by said circuit board.

6. A gyro-sensor apparatus according to claim 5 wherein contact paths are provided on said gyro-sensor and/or said circuit board concentric to a center point of said housing when said gyro-sensor is inserted into said housing.

7. A gyro-sensor apparatus according to claim 1, further comprising:

a circuit board on which said gyro-sensor is placed, wherein said gyro-sensor is held in said housing by said circuit board.

8. A gyro-sensor apparatus according to claim 3, further comprising:

a circuit board on which said gyro-sensor is placed, wherein said gyro-sensor is held in said housing by said circuit board.

9. A gyro-sensor apparatus according to claim 4, further comprising:

a circuit board on which said gyro-sensor is placed, wherein said gyro-sensor is held in said housing by said circuit board.

* * * * *